(12) United States Patent
Dissinger et al.

(10) Patent No.: US 7,850,860 B2
(45) Date of Patent: Dec. 14, 2010

(54) PLATE SETTLER WITH ANGULAR SUPPORT MEMBERS

(75) Inventors: Kerry Dissinger, Fort Mill, SC (US); David Myers, Charlotte, NC (US)

(73) Assignee: Jim Myers & Sons, Inc., Pineville, NC (US)

( * ) Notice: Subject to any disclaimer, the term of this patent is extended or adjusted under 35 U.S.C. 154(b) by 125 days.

(21) Appl. No.: 12/411,120

(22) Filed: Mar. 25, 2009

(65) Prior Publication Data

US 2010/0243585 A1    Sep. 30, 2010

(51) Int. Cl.
*B01D 21/02* (2006.01)
(52) U.S. Cl. .................. 210/802; 210/521; 210/522
(58) Field of Classification Search .......... 210/802, 210/521, 522, 532.1, 540
See application file for complete search history.

(56) References Cited

U.S. PATENT DOCUMENTS

| | | | |
|---|---|---|---|
| 3,862,033 A | 1/1975 | Rozkydalek |
| 3,886,064 A | 5/1975 | Kosonen |
| 4,089,782 A | 5/1978 | Huebner |
| 4,120,796 A | 10/1978 | Huebner |
| 4,156,644 A | 5/1979 | Richard |
| 4,595,504 A | 6/1986 | Hellman et al. |
| 4,681,683 A | 7/1987 | Lindstol |
| 4,865,753 A | 9/1989 | Meurer |
| 4,889,624 A | 12/1989 | Soriente et al. |
| 4,933,524 A | 6/1990 | Meurer |
| 5,049,278 A | 9/1991 | Galper |
| 5,089,136 A | 2/1992 | Cyr |
| 5,116,443 A | 5/1992 | Meurer |
| 5,391,306 A | 2/1995 | Meurer |
| 5,397,472 A | 3/1995 | Bouchard |
| 5,584,993 A | 12/1996 | Van Der Schrieck |
| 6,245,243 B1 | 6/2001 | Meurer |
| 6,817,476 B2 | 11/2004 | Donnick, Jr. et al. |

(Continued)

FOREIGN PATENT DOCUMENTS

EP    0 403 590 B1    12/1989

(Continued)

OTHER PUBLICATIONS

*Meurer Research, Inc.—Plate Settlers*, http://www.meurerresearch.com/plates.html (visited Mar. 25, 2009).

(Continued)

*Primary Examiner*—Christopher Upton
(74) *Attorney, Agent, or Firm*—Alston & Bird LLP

(57) ABSTRACT

Various embodiments of the present invention are directed to a plate settler comprising: a plurality of plates, each plate defining a first end, a second end, and a settling surface there between; a plurality of angular support members extending from and structurally supporting the first ends of respective ones of the plurality of plates, each angular support member defining a first lateral flow encouraging surface and a second lateral flow encouraging surface; and a plurality of headloss control gaps defined by the plurality of angular support members. The first lateral flow encouraging surface of each angular support member may combine with the second lateral flow encouraging surface of an adjacent angular support member to define a generally v-shaped lateral flow channel.

35 Claims, 6 Drawing Sheets

U.S. PATENT DOCUMENTS

| | | | |
|---|---|---|---|
| 7,165,683 B2 | | 1/2007 | Boulant |
| 7,334,689 B2* | | 2/2008 | Galvin et al. ............... 210/521 |
| 2002/0046977 A1 | | 4/2002 | Terrien et al. |
| 2004/0031750 A1* | | 2/2004 | Larsson ..................... 210/521 |
| 2008/0314823 A1 | | 12/2008 | Kulick, III et al. |

FOREIGN PATENT DOCUMENTS

| | | |
|---|---|---|
| EP | 0 636 396 B1 | 3/1999 |
| WO | WO 89/12492 | 12/1989 |

OTHER PUBLICATIONS

*FlexKlear™ Inclined Plate Settlers*, http://www.glv.com/WATER/Municipal_Water/Sedimentation/FlexKlear_Inclined Plate_Settlers/ProductDescription.aspx (visited Mar. 25, 2009).

*Lamella Gravity Settler—Inclined Plate Settler*, Parkson Corporation, http://www.parkson.com/parksonassets/brochures/lamella.pdf (visited Mar. 26, 2009).

*The Lamella Gravity Settler Has Consistently Produced Results In Over 4,000 Installations Since 1971*, Parkson Corporation, http://www.parkson.corn/Content.aspx?ntopicid=49&parent=industrial&processID=70&offeringID=67 (visited Mar. 26, 2009).

*IPS/// Inclined Plate Settlers*, WesTech, Inc., http://www.westech-inc.com/product.cfm?ItemID=79&Cat=6 (visited Mar. 26, 2009).

*Inclined Plate Settlers*, WesTech, Inc., http://www.westech-inc.com/public/brochures/InclinePlate1.pdf (visited Mar. 26, 2009).

*Compact Settling With the Johnson Lamella Separator*, http://www.nordicwater.se/Dok/nwp_ls_en.pdf (visited Mar. 26, 2009).

*Inclined Plate Separators*, Siemens AG 2009, http://www.water.siemens.com/en/products/separation_clarification/plate_clarifiers/Pages/Zimpro_Inclined_Plate_Separators.aspx (visited Mar. 26, 2009).

*Siemens Water Technologies Inclined Plate Separators Remove Solids At Atlanta-Fulton County*, Siemens Ag 2009, http://www.water.siemens.com/en/applications/drinking_water_treatment/Pages/zimpro_atlanta_fulton_cs.aspx (visited Mar. 26, 2009).

*Racine Uses Siemens Water Technologies Inclined Plate Separators To Clarify Drinking Water*, Siemens AG 2009, http://www.water.siemens.com/en/applications/drinking_water_treatment/Pages/zimpro_racine_cs.aspx (visited Mar. 26, 2009).

\* cited by examiner

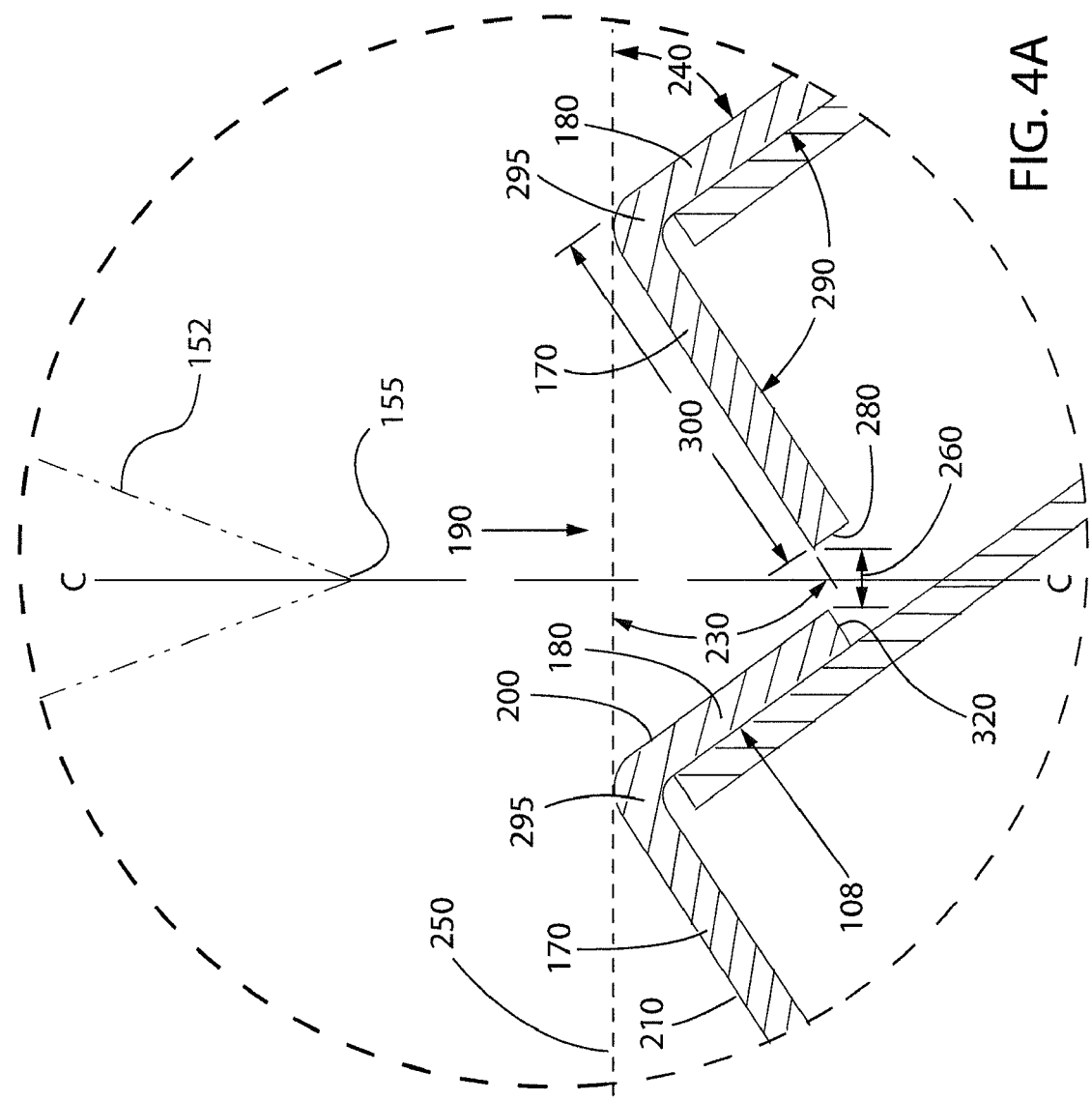

PLATE SETTLER WITH ANGULAR SUPPORT MEMBERS

BACKGROUND OF THE INVENTION

Clarifiers may be used to remove solids from a fluid suspension such as, for example, during the treatment of wastewater. The removal of the solids occurs through sedimentation where the wastewater is allowed to pass through large basins or tanks, commonly referred to as "clarifiers."

A lamella clarifier or "plate settler" is a type of clarifier having a series of mutually parallel plates disposed therein. Each plate defines a settling surface that is structured in contact with a wastewater flow. As the flow travels upward between the parallel plates along their respective settling surfaces, the heavier solids begin to collect on the settling surfaces and, thus, are removed from the lighter wastewater flow.

Applicant has identified a number of deficiencies and problems associated with the manufacture, use, and maintenance of conventional wastewater clarifiers. Through applied effort, ingenuity, and innovation, Applicant has solved many of these identified problems by developing a solution that is embodied by the present invention, which is described in detail below.

BRIEF SUMMARY OF THE INVENTION

Various embodiments of the present invention are directed to a plate settler comprising: a plurality of plates, each plate defining a first end, a second end, and a settling surface there between; a plurality of angular support members extending from and structurally supporting the first ends of respective ones of the plurality of plates, each angular support member defining a first lateral flow encouraging surface and a second lateral flow encouraging surface; and a plurality of headloss control gaps defined by the plurality of angular support members. The first lateral flow encouraging surface of each angular support member may combine with the second lateral flow encouraging surface of an adjacent angular support member to define a generally v-shaped lateral flow channel.

In some embodiments, each of the angular support members may further comprise a first leg and a second leg, wherein the first leg defines the first lateral flow encouraging surface and the second leg defines the second lateral flow encouraging surface. In such embodiments, the second leg may be coupled proximate the first end of a respective one of the plurality of plates. The first leg and the second leg may define an intersection, wherein a first runoff angle is defined between the first leg and an imaginary horizontal plane passing through the intersection, and a second runoff angle is defined between the second leg and the imaginary horizontal plane passing through the intersection.

In other embodiments, a headloss control angle is defined between the first leg and the second leg. This headloss control angle may be between approximately 80 and 100 degrees. Plate settlers structured in accordance with embodiments of the invention may be configured to produce a gap headloss, a remainder headloss, and a headloss control length. In one embodiment, the headloss control length and the headloss control angle may be selected to produce a gap headloss that is approximately equal to ten times the remainder headloss.

Plate settlers structured in accordance with various embodiments may be placed within a basin comprising at least one longitudinally-extending weir. In one embodiment, the plate settlers may be structured such that wastewater flowing through the plate settler is directed along the generally v-shaped lateral flow channels formed between adjacent angular support members into the at least one longitudinally-extending weir. In another embodiment, the longitudinally-extending weir defines at least one v-notch generally aligned with a corresponding generally v-shaped lateral flow channel.

In additional embodiments, plate settlers may include plates having corresponding angular support members extending there from. In one embodiment, each of the plates includes a corresponding angular support member while, in other embodiments, only a majority of the plates include a corresponding angular support member extending there from.

Plate settlers structured in accordance with various embodiments may include at least one headloss control gap that is defined between an angular support member and an adjacent angular support member. In other embodiments, at least one headloss control gap may be defined between an angular support member and the plate settling surface of an adjacent plate.

Still other embodiments of the invention are directed to a method of separating a plurality of solids from a wastewater flow using a plate settler comprising a plurality of plates and a plurality of angular support members. The plurality of angular support members may extend from and structurally support respective ones of the plurality of plates. The plurality of angular support members may be structured to define a plurality of headloss control gaps and a plurality of generally v-shaped lateral flow channels. The method may include a step of directing the wastewater flow through the plurality of plates, through the plurality of headloss control gaps, and into the generally v-shaped lateral flow channels. Still other embodiments include steps for directing the wastewater flow through the generally v-shaped lateral flow channels and over a longitudinally-extending weir. In one embodiment, the longitudinally-extending weir may define v-notches that are generally aligned with the general v-shaped lateral flow channels and/or corresponding headloss control gaps.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4A is a detail view of the plate settler assembly section shown in FIG. 4, taken along detail circle 4A.

DETAILED DESCRIPTION OF THE INVENTION

The invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
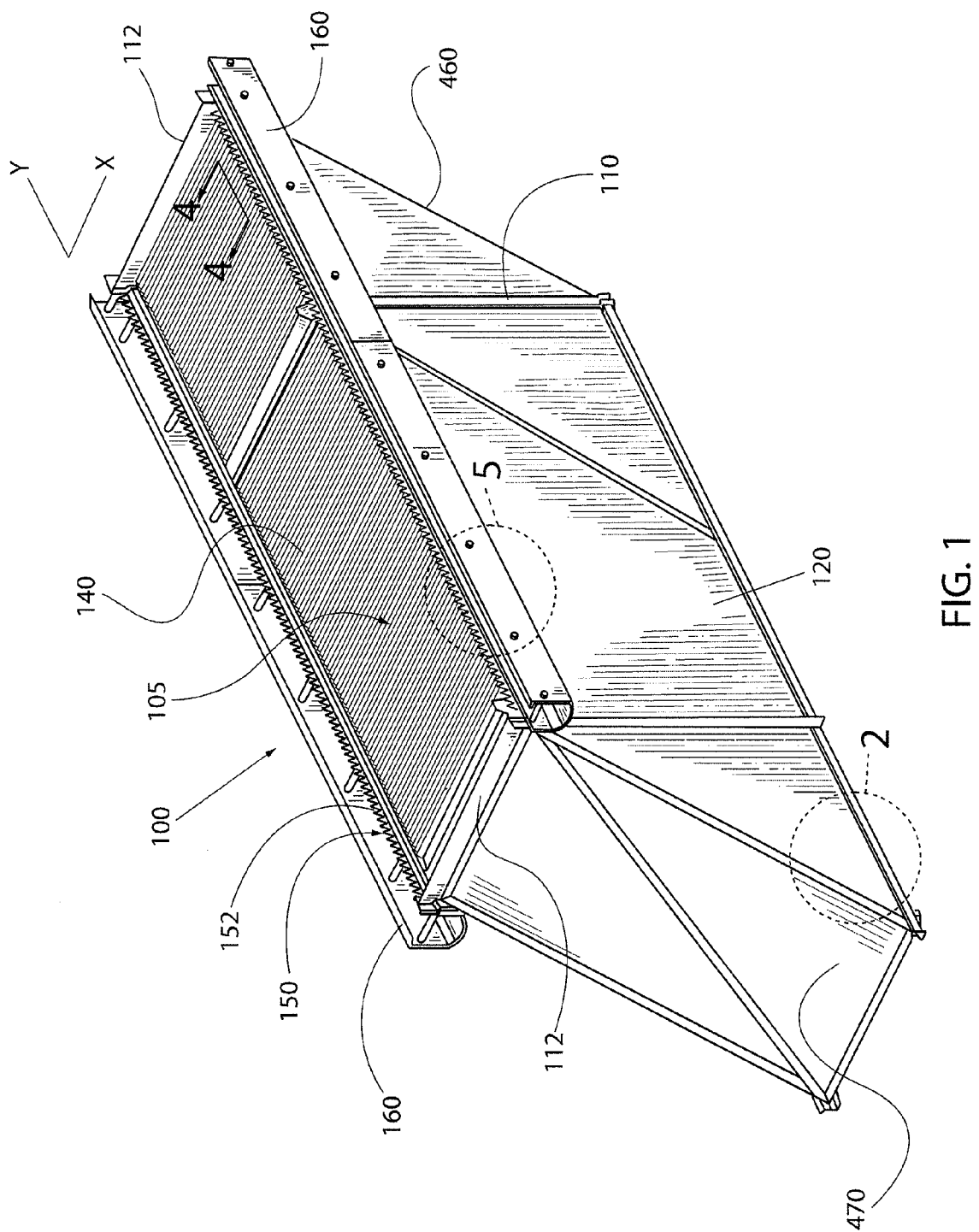
FIG. 1 is a perspective view of a clarifier system incorporating a plurality of plate settler assemblies structured in accordance with various embodiments of the invention.

FIG. 1 depicts a clarifier system 100 having a plurality of plate settler assemblies 105 structured in accordance with various embodiments of the invention. As will be apparent to one of skill in the art in view of this disclosure, the depicted clarifier system 100 may be combined with other similar or differently configured clarifier systems (not shown) and positioned within a sedimentation basin of a water treatment facility (not shown). In other embodiments, the depicted clarifier system 100 may be used as a standalone clarification unit.

Various aspects of the invention are described below in terms of a longitudinal and a lateral direction. For illustration purposes, a coordinate axis is shown in FIG. 1 having a Y axis directed generally in a longitudinal direction and an X axis directed generally in a lateral direction. As will be apparent to one of skill in the art, the longitudinal and lateral directions are generally perpendicular to one another.

The depicted clarifier system 100 is comprised of a frame 110 configured to enclose and support the plurality of plate settler assemblies 105. The clarifier system 100 further comprises two longitudinally-aligned trough assemblies 160 that are disposed proximate to two inwardly-positioned (at least relative to the trough assemblies), and longitudinally-aligned, weir assemblies 150. Note that while the clarifier system 100 of FIG. 1 is shown as having two side-load trough assemblies 160, it is recognized that the clarifier system would also function in substantially the same way with one side-load trough assembly. The depicted weir assemblies 150 define a plurality of v-notches 152 along their lengths as shown. In other embodiments, the weir assemblies may include semi-circular, square, sinusoidal shaped, or other types of notches as will be apparent to one of ordinary skill in the art in view of this disclosure.

Figure 2:
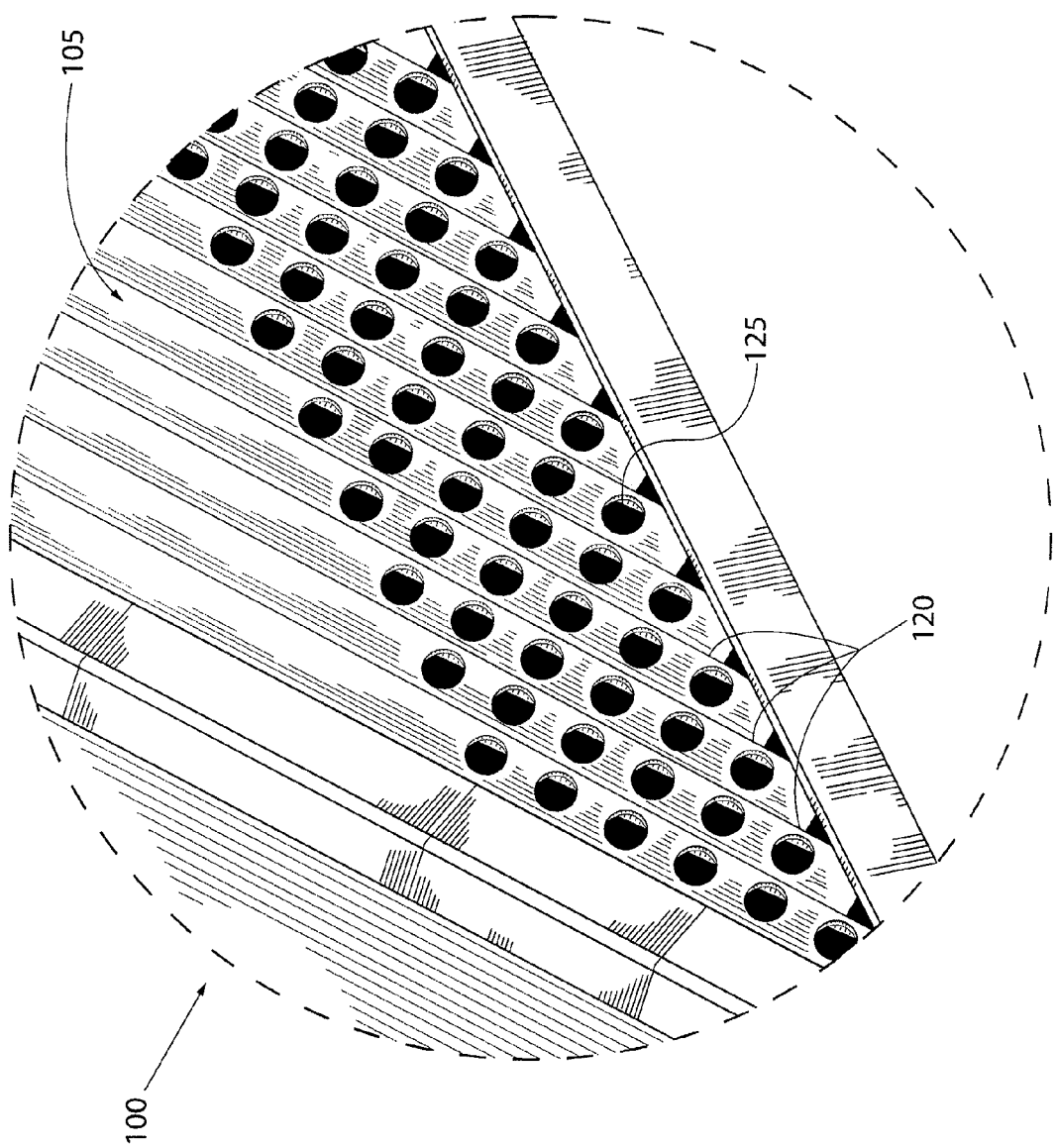
FIG. 2 is a detail view of inlet ports positioned proximate the base of the clarifier system shown in FIG. 1, taken along detail circle 2.

The clarifier system 100 comprises a first end plate 460 and a second end plate 470 that combine with the structure of the frame 110 to support and enclose the plurality of plate settler assemblies 105. Additionally, baffles 112 may extend from respective ends of the frame 110. Referring briefly to FIG. 2, which shows a detail view of the base of the clarifier system 100 shown in FIG. 1, taken along detail circle 2, wastewater flows are introduced into inlet ports 125 positioned proximate the base of the plate settler assemblies 105 as shown. The wastewater flows then move upwardly through inter-plate channels defined between the parallel plates 120. Referring back to FIG. 1, the wastewater flows then travel out through gaps between mutually adjacent angular support members 140 that are positioned proximate the top of the plates 120 comprising the plate settler assemblies 105. The wastewater emerging from between the angular support members 140 is then directed laterally over the weir assemblies 150 and into the trough assemblies 160 as discussed in detail in connection with FIG. 5 below.

Figure 3:
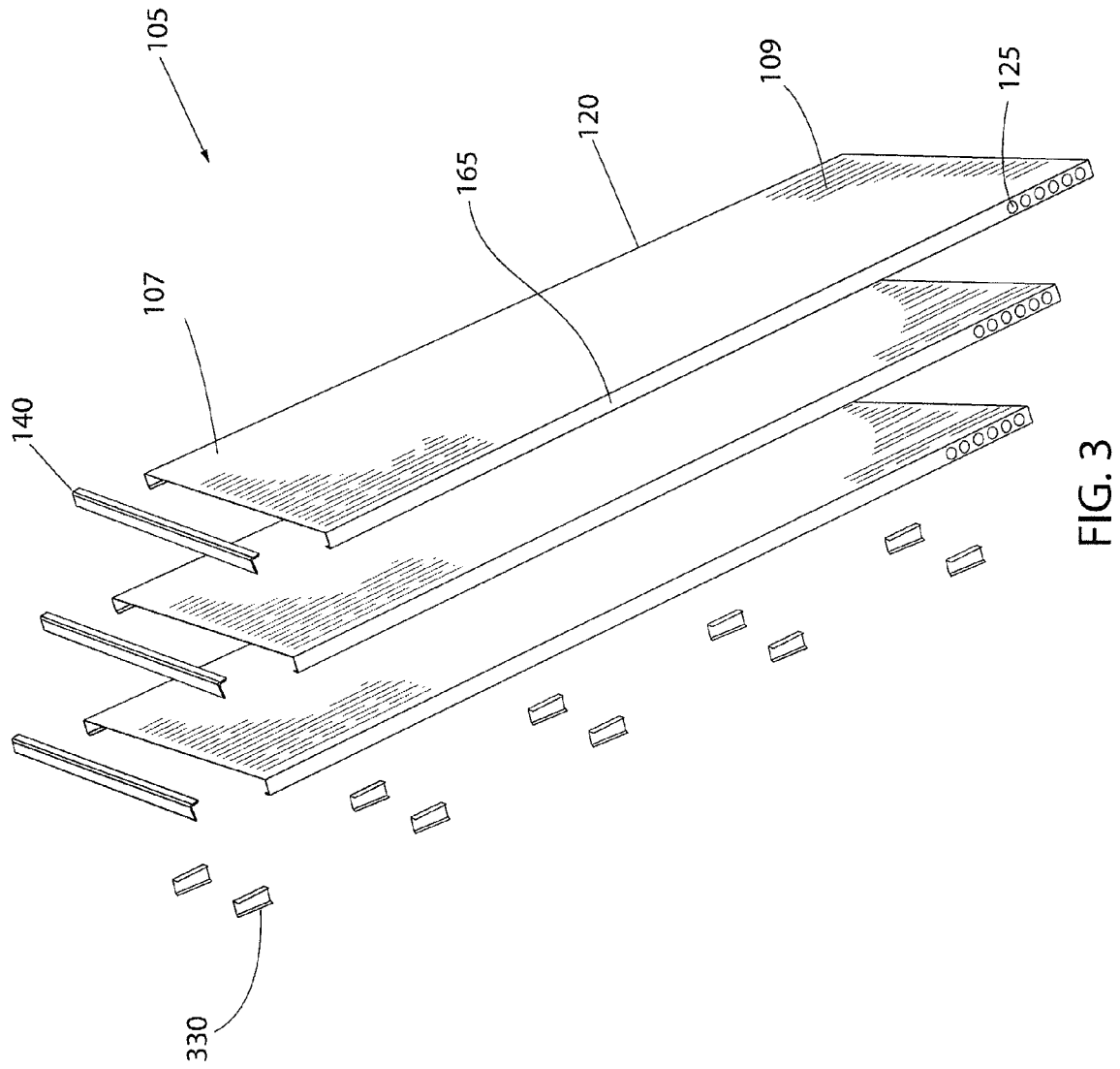
FIG. 3 is an exploded perspective view of a plate settler assembly structured in accordance with one embodiment of the invention.

FIG. 3 illustrates an exploded perspective view of a plate settler assembly 105 structured in accordance with one embodiment of the invention. The depicted plate settler assembly 105 comprises several plates 120 that are positioned substantially parallel to one other to form the inter-plate channels referenced above. One or more plate spacers 330 may be positioned between respective pairs of plates 120 so as to maintain fixed inter-channel dimensions as may be needed. Angular support members 140 may be attached to each of the plates 120.

Figure 4:
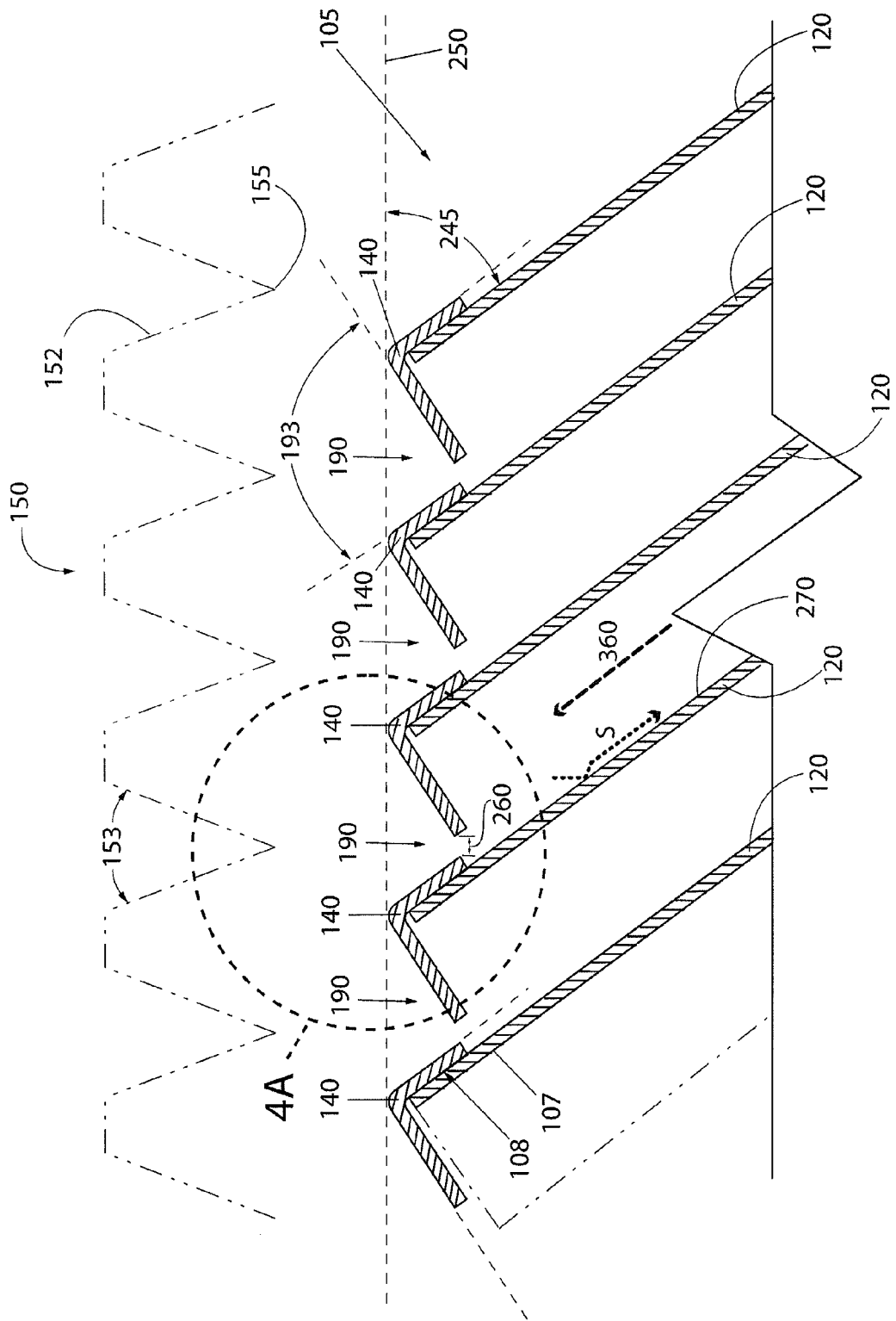
FIG. 4 is a partial section view of a plate settler assembly shown in FIG. 1, taken along section line 4-4.

The plate settler assemblies shown in FIGS. 3 and 4 are depicted having a specific number of plates simply for illustration purposes. As will be apparent to one of ordinary skill in the art, plate settler assemblies structured in accordance with embodiments of the present invention may have more or fewer plates than the number shown depending on the settling surface area selected for the plate settler, the intended modularity of the clarifier system, and other design constraints.

The plate settler assembly 105 shown in FIG. 3 defines a first end 107 and a second end 109. In the depicted embodiment, the first end 107 is disposed proximate the top of the plate settler assembly 105 while the second end 109 is disposed proximate the bottom of the plate settler assembly. However, in other embodiments, the orientation of the first and second ends 107, 109 may be reversed as will be apparent to one of ordinary skill in the art in view of this disclosure.

End plates or flanges 165 are defined along the lateral sides of each plate 120 of the plate settler assembly 105. The end flanges 165 may be integrally formed with each plate 120 by bending lateral edges of each plate. For example, two bends of each lateral edge of the plates 120 can create longitudinally extending end flanges 165 as shown. Alternatively, in another embodiment, the end plates may comprise separate pieces (not shown) that are attached to plates 120, such as by welding, riveting, or other known attachment methods. The end flanges 165 may combine with mutually adjacent plates 120 to define a sealed boundary for each respective inter-plate channel.

The plates 120 and end flanges 165 of plate settler assemblies 105 structured in accordance with various embodiments of the invention may be manufactured from a variety of materials including, but not limited to, stainless steel, fiber-reinforced composites, aluminum, and plastic composites. For example, in one embodiment, the plurality of plates 120 and end flanges 165 may be integrally manufactured from between 20 to 26 gauge stainless steel. In another embodiment, the plurality of plates 120 and end flanges 165 may be manufactured from 24 gauge stainless steel. In still other embodiments, individual plates 120 and end flanges 165 may be manufactured from a selected material while other plates and end flanges used in a single clarifier system 100 (see FIG. 1) may be manufactured from different materials.

As discussed above with regard to FIG. 2, a plurality of inlet ports 125 may be defined in the end flanges 165 proximate the second end 109 of the plate settler assembly 105. The inlet ports 125 are adapted to receive wastewater entering the plate settler assembly 105.

FIG. 4 illustrates a section view of the plate settler assembly 105 shown in FIG. 1. The depicted plate settler assembly 105 comprises a plurality of plates 120 each having an angular support member 140 extending from a first end 107 thereof. The angular support members 140 are supported at their lateral edges (not shown) by the frame 110 (see FIG. 1) of the plate settler assembly 105. In one embodiment, each of the angular support members 140 defines a lateral length (not shown) that exceeds the lateral length of a corresponding plate 120 so that the plates are configured to hang from the angular support members without themselves directly attaching to the frame 110 (see FIG. 1).

Turning to the detail view of FIG. 4A, each angular support member 140 comprises a first leg 170, a second leg 180, and an intersection 295 defined there between. In the depicted embodiment, the second leg 180 of each angular support member 140 comprises an attachment surface 108 for attachment to a corresponding plate 120. This attachment may occur through a variety of known attachment means, including welding, riveting, bolted connections, brazing, mechanical interlocking, adhesive attachment, etc. However, in alternate embodiments, the second leg 180 need not be attached and may instead be formed as integral to the first end 107 of a corresponding plate 120.

Referring collectively to FIGS. 4 and 4A, the plates 120 and angular support members 140 are positioned at selected angles relative to an imaginary horizontal plane 250. For example, the first and second legs 170, 180 of the angular support members 140 define a first runoff angle 230 and a second runoff angle 240, respectively, relative to the imaginary horizontal plane 250. Each plate 120 defines a settling angle 245 relative to the imaginary horizontal plane 250. In the depicted embodiment, the settling angle 245 is equal to the second runoff angle 240 as shown. Although the first and second runoff angles 230, 240 and the settling angle 245 are called out relative to a single angular support member 140 for ease of illustration in FIG. 4, one of ordinary skill in the art will readily appreciate that such angles are repeated in connection with each of the angular support members.

In various embodiments, the plurality of plates 120 are positioned substantially parallel to one another. It should be noted, however, that absolute parallel relationships are not required for the plate settler assemblies 105 to function. Further, the settling angle 245 of the plurality of plates 120 with respect to the imaginary horizontal plane 250 may be varied. For example, in various embodiments the settling angle 245 may range between 40 to 75 degrees. In one embodiment, the settling angle 245 may be set at 55 degrees.

In various embodiments of the invention, the angular support members 140 are positioned and structured to define a headloss control gap 260. In particular, in one embodiment, as shown in the detail view of FIG. 4A, the headloss control gap 260 may be defined between an angular support member 140 and the angular support member of an adjacent plate 120. In another embodiment, the headloss control gap 260 may be defined between an angular support member and the plate settling surface of an adjacent plate (not shown). In still another embodiment, the headloss control gap 260 may be defined between an angular support member 140 and a baffle (not shown) or the first end plate 460 (see FIG. 1). In such embodiments, the gap defined between the angular support member and the baffle/end plate may define the same lateral length as the rest of the headloss control gaps.

Returning to the embodiment depicted in FIG. 4A, the headloss control gap 260 is defined between an end 280 of a first leg 170 of an angular support member 140 and an end 320 of a second leg 180 of an adjacent angular support member. In embodiments where the angular support members are formed integrally with a corresponding one of the plurality of plates (not shown), the headloss control gap may be defined between an end of a first leg of the angular support member and the settling surface of an adjacent plate. In such a case, there may be no defined transition between the second leg of an angular support member and its corresponding settling surface. In other embodiments where an angular support member defines a relatively long second leg (not shown) and an attachment transition is defined between the angular support member and its corresponding settling surface, the headloss control gap may be defined between the end of the first leg of an angular support member and the plate settling surface of the adjacent plate. In summary, headloss control gaps structured in accordance with various embodiments of the invention may be defined by the smallest gap created between an angular support member and an adjacent portion of the plate settler assembly (e.g., settling surface, second leg of an angular support member, etc.).

The precise dimensions of the headloss control gap 260 may be controlled by selecting a headloss control length 300 for the first leg 170 of the angular support member 140, a headloss control angle 290 defined between the first and second legs 170, 180, and/or by selecting first and second runoff angles 230, 240 for the angular support member 140. In one embodiment, the headloss control angle 290 is set at approximately 90 degrees.

In various embodiments, the headloss control gap 260 may define a gap width along the longitudinal direction selected between 0.1 inches and 0.75 inches. In one embodiment, the headloss control gap 260 may define a gap width along the longitudinal direction of 0.25 inches.

Turning collectively to FIGS. 4 and 4A, in some embodiments, the second runoff angle 240 may match the settling angle 245 and, thus, may range between 40 to 75 degrees. In such embodiments, the first runoff angle 230 may range between 15 to 50 degrees. In one embodiment, the first runoff angle 230 is set at approximately 35 degrees while the second runoff angle 240 is set at approximately 55 degrees.

In still other embodiments, the headloss control length 300 may be selected from a range between 0.5 and 4 inches. In one embodiment, the headloss control length 300 is set at approximately 1.75 inches. It will be apparent to one of ordinary skill in the art, that the above referenced dimensions may be scaled upwardly or downwardly to produce a desired headloss and based, at least to some extent, on the relative size of the propose plate settler assembly 105. For example, the above described dimensions and specifications may be appropriate for embodiments of plate settler assemblies 105 having plates 120 that are approximately 56 inches wide and approximately 10 feet long.

In another embodiment, each angular support member 140 defines a first lateral flow encouraging surface 210 along the first leg 170 and a second lateral flow encouraging surface 200 along the second leg 180 as shown. The first lateral flow encouraging surface 210 of an angular support member 140 combines with the second lateral flow encouraging surface 210 of an adjacent angular support member 140 to define a generally v-shaped lateral flow channel 190. Each generally v-shaped lateral flow channel 190 defines a lateral flow channel angle 193 as shown in FIG. 4. The structure of the v-shaped lateral flow channel 190 is also illustrated by the detail perspective view of FIG. 5.

A weir assembly 150 defining a plurality of v-notches 152 is illustrated by phantom lines in FIG. 4. Each v-notch 152 defines a notch angle 153 and a vertex 155. In one embodiment, the plurality of v-notches 152 of the weir assembly 150 are generally aligned with midpoints of corresponding headloss control gaps 260 as illustrated by centerline C-C of FIG. 4A. Such aligned v-notches may be referred to individually as an aligned notch while such aligned headloss control gaps may be referred to individually as an aligned gap. In other embodiments, the plurality of v-notches 152 of the weir assembly 150 are generally aligned with the generally v-shaped lateral flow channels 190 defined between adjacent angular support members 140. Said differently, the plurality of v-notches 152 of the weir assembly 150 may be generally aligned with a midpoint defined between intersections 295 of adjacent angular support members 140. Returning to FIG. 4, in another embodiment, the generally v-shaped lateral flow channels 190 may define respective lateral flow channel angles 193 that are substantially equal to (not shown) the notch angles 153 of corresponding v-notches 152 defined in the weir assembly 150.

Angular support members 140 structured in accordance with various embodiments of the invention may be manufactured from a variety of materials including, but not limited to, stainless steel, fiber reinforced composites, aluminum, and plastic composites. In one embodiment, the angular support members 140 are made from a material having strength sufficient to support: (1) the plurality of plates 120 hanging from the angular support members; and (2) a technician's weight as the technician walks over the angular support members during cleaning of the plate settler assembly 105. For example, in one embodiment, the angular support members 140 may be manufactured from 7 gauge stainless steel. However, other thicknesses of stainless steel may be used to form the angular support members 140, such as thicknesses in the range of 0.125 to 0.375 inches.

Plate settler assemblies 105 structured in accordance with various embodiments of the invention may include one angular support member 140 for each one of the plurality of plates 120. In alternate embodiments, without deviating from the inventive concepts herein described, some of the plurality of plates 120 may include an angular support member 140 while others do not. For example, a first end plate 460 (see FIG. 1) may serve as a support plate and may not include an angular support member 140. In such embodiments, the first end plate may be coupled directly to the frame of the plate settler assembly for structural support, and a baffle may partially define the headloss control gap (not shown).

As further shown in FIG. 4, in one embodiment, a wastewater flow 360 enters a respective one of the plurality of inlet ports 125 (see FIGS. 2 and 3) and is forced upwardly through the inter-plate channel defined between a pair of plates 120. As the wastewater flow 360 travels upwardly along the settling surface 270, heavier solids S begin to settle out from the wastewater flow 360. As the solids S settle, they join with additional solids and collect along the settling surface 270. In the depicted embodiment, the settling surface 270 defines a settling angle 245 that encourages the solids S to agglomerate and generally travel in a downward direction counter to the upward direction of the wastewater flow 360. The solids S continually move downwardly toward the second end 109 (see FIG. 3) of the plates 120 until they are eventually removed using one or more sludge collection devices that are known in the art.

In still another embodiment of the invention, the wastewater flow 360 continues to move upwardly within the inter-plate channel until it is directed to flow through the headloss control gap 260 by the angular support member 140. Advantageously, the headloss control gap 260 defines a continuous gap or opening that uniformly extends substantially across the full lateral length of the plate settler assembly 105 (see FIG. 1). Although not wishing to be bound by theory, it is believed that this relatively uniform laterally extending headloss control gap 260 produces a desired gap headloss that may encourage a more laminar flow of the wastewater 360 through the inter-plate channel. As a result, plate settlers structured in accordance with the present invention operate more efficiently and produce a greater quantity of solids settling out from wastewater when compared to other plate settler assemblies.

In various embodiments of the invention, the angular support members 140 are structured to define headloss control gaps 260 adapted to produce a desired gap headloss value. In this regard, each plate settler assembly 105 produces an assembly headloss that is the sum of a gap headloss (measured proximate the headloss control gap) and a remainder headloss resulting from all other combined headlosses within the plate settler assembly. For example, in some embodiments, the angular support members 140 are structured to define headloss control gaps 260 that produce a gap headloss value between five and fifteen times that of the remainder headloss. In one embodiment, the angular support members are structured to define headloss control gaps that produce a gap headloss value that is approximately ten times greater than the remainder headloss. Such headloss values may be calculated using Navier-Stokes equations. Notably, in various embodiments, the angular support members 140 are structured from rigid materials (e.g., stainless steel) so as to ensure a consistent headloss control gap 260 despite fluctuating inter-plate channel pressures.

Figure 5:
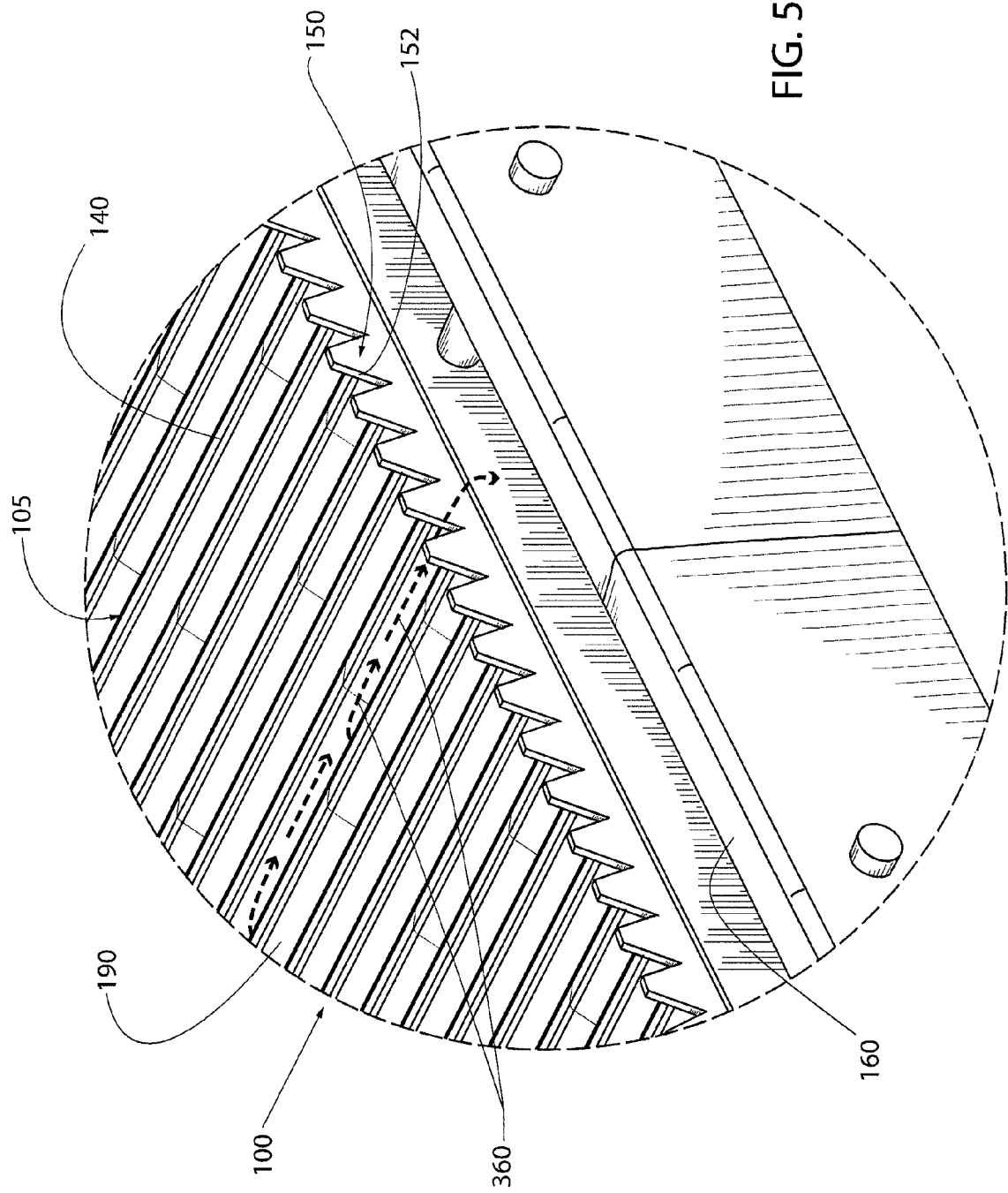
FIG. 5 is a detail view of the clarifier system shown in FIG. 1, taken along detail circle 5, which illustrates a flow path from the plate settler assembly over a longitudinally-extending weir and into a longitudinally-extending trough assembly.

FIG. 5 is a detail perspective view of the weir 150 and trough 160 assemblies of the clarifier system 100 that are positioned proximate a lateral edge of a plate settler assembly 105 structured in accordance with one embodiment of the invention. Upon exiting the headloss control gap 260 (see FIGS. 4 and 4A), the wastewater flow 360 collects in the v-shaped lateral flow channels 190 defined between adjacent angular support members 140 as shown. A fluid head builds until the level of wastewater reaches the v-notches 152 of the weir assembly 150. The wastewater 360 then flows in streams through the v-notches 152 and into the trough assemblies 160. While not wishing to be bound by theory, it is believed that the v-shape of the v-shaped lateral flow channels 190 operates to encourage the lateral flow of wastewater streams 360 toward aligned v-notches 152 in the weir assembly 150 while limiting, at least to some extent, commingling of adjacent wastewater streams within the fluid head.

Notably, the v-shaped lateral flow channels 190 defined by the mutually adjacent angular support members 140 advantageously provide only angled surfaces facing the fluid head (plurality of wastewater streams 360) as it flows over the weir assembly 150 and into the trough assemblies 160. Such angled surfaces (see the cross section view of the angle support members 140 shown in FIGS. 4 and 4A) are less likely to accumulate sediment deposits that could inhibit fluid flow and degrade settler efficiency when compared to "flat-surface" settlers of the prior art, which have a flat "deck" or "freeboard" as such terms are known in the art.

In one embodiment, the structure of the angular support members 140 and the positioning of the v-notches 152 of the weir 150 each serve to resist plate 120 corrosion. As will be appreciated by one of ordinary skill in the art, plates 120 that are exposed to an air/water interface are more likely to corrode than those not so exposed. In various embodiments of the invention, the angular support members 140 operate to "cap" corresponding plate 120 ends thereby protecting the plates 120 submerged beneath from the relatively corrosive air/water interface. In the embodiment illustrated by FIGS. 4 and 4A, an additional level of protection is provided as the v-notches 152 formed in the weir 150 define a minimum head height (i.e., generally defined between vertex 155 and the imaginary horizontal plane 250) that ensures that the air/water interface is aligned generally with the vertices 155 of the v-notches 152 and raised well above the submerged plates 120.

The foregoing description has described the movement of wastewater flows 360 through plate settler assemblies 105 in terms of an upward, counter-flow arrangement. However, as will be understood by one of skill in the art in view of this disclosure, various other flow configurations are possible. In this regard, the plate settler assemblies 105 structured in accordance with embodiments of the invention are not intended to be limited to use with one particular flow direction. Rather, it is believed that the headloss control gaps 260 and corresponding angular support members 140 discussed herein are usable in applications outside of the particular flow arrangement described above.

The fluid moving through the plate settler assembly discussed above is referred to as a wastewater flow 360 for illustration purposes. However, as will be apparent to one skilled in the art in view of this disclosure, the present invention is not limited to sewage treatment applications. Indeed, the term "wastewater" as used herein refers broadly to any fluid, suspension, or solution that contains solids, whether dissolved or otherwise, which are desirably removed from the fluid.

Plate settler assemblies 105 structured in accordance with various embodiments of the invention may provide a number of advantages over the prior art. For example, plate settler assemblies 105 structured as discussed above may be configured to produce a gap headloss that is ten times greater than the remainder headloss within the plate settler assemblies. Such plate settlers may also be configured to produce a laminar fluid flow both through the inter-plate channels and along the v-shaped lateral flow channels 190. Plate settler assemblies 105 structured in accordance with one embodiment of the invention provide greater settling efficiency and are less likely to develop efficiency blocking sediment deposits. Plate settler assemblies 105 as described herein are relatively easy to clean as the headloss control gaps 260 (see FIGS. 4 and 4A) are relatively large and located immediately adjacent to settling surfaces 270 (see FIG. 4) of the plates 120 (see FIG. 4) thereby providing technicians with enhanced cleaning access. Finally, plate settler assemblies 105 structured in accordance with various embodiments of the invention are strong and durable incorporating robust angular support members 140 that are configured to support settling plates 120 (see FIG. 4) hanging therefrom while also supporting the weight of a technician walking across the top surface of the plate settler assembly 105 during cleaning or maintenance operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A plate settler comprising:
   a plurality of plates, each plate defining a first end, a second end, and a settling surface defined therebetween;
   a plurality of angular support members extending from and structurally supporting the first ends of respective ones of the plurality of plates, each angular support member defining a first lateral flow encouraging surface and a second lateral flow encouraging surface;
   a plurality of headloss control gaps defined by the plurality of angular support members; and
   wherein the first lateral flow encouraging surface of each angular support member combines with the second lateral flow encouraging surface of an adjacent angular support member to define a generally v-shaped lateral flow channel.

2. The plate settler of claim 1, wherein each of the headloss control gaps is positioned proximate to the settling surface of the adjacent plate to provide for cleaning access thereto.

3. The plate settler of claim 1, wherein each of the angular support members further comprises a first leg and a second leg, and
   wherein the first leg defines the first lateral flow encouraging surface and the second leg defines the second lateral flow encouraging surface.

4. The plate settler of claim 1, wherein at least one of the plurality of angular support members further comprises a first leg and a second leg,
   wherein the first leg defines the first lateral flow encouraging surface and the second leg defines the second lateral flow encouraging surface, and
   wherein the second leg is coupled proximate the first end of the respective one of the plurality of plates.

5. The plate settler of claim 4, wherein the first leg and the second leg meet at an intersection, wherein a first runoff angle is defined between the first leg and an imaginary horizontal plane passing through the intersection, and
   wherein a second runoff angle is defined between the second leg and the imaginary horizontal plane passing through the intersection.

6. The plate settler of claim 4, wherein a headloss control angle is defined between the first leg and the second leg.

7. The plate settler of claim 6, wherein the headloss control angle is between approximately 80 and 100 degrees.

8. The plate settler of claim 6, wherein the plate settler is configured to produce a gap headloss and a remainder headloss, wherein the first leg defines a headloss control length, and wherein the headloss control length and the headloss control angle are selected to produce a gap headloss that is approximately equal to ten times the remainder headloss.

9. The plate settler of claim 1, wherein the plate settler is structured for placement within a basin and further comprises at least one longitudinally-extending weir, and the plate settler is further configured such that a fluid flowing through the plate settler is directed along the generally v-shaped lateral flow channel into the at least one longitudinally-extending weir.

10. The plate settler of claim 9, wherein the weir defines at least one v-notch generally aligned with at least one of the plurality of headloss control gaps.

11. The plate settler of claim 9, wherein the weir defines at least one v-notch generally aligned with the generally v-shaped lateral flow channel.

12. The plate settler of claim 1, wherein each of the plates includes a corresponding one of the plurality of angular support members extending there from.

13. The plate settler of claim 1, wherein a majority of the plates includes a corresponding one of the plurality of angular support members extending there from.

14. The plate settler of claim 1, wherein at least one of the plurality of headloss control gaps is defined between one of the angular support members and the adjacent angular support member.

15. The plate settler of claim 1, wherein at least one of the plurality of headloss control gaps is defined between one of the angular support members and the plate settling surface of an adjacent plate.

16. In a plate settler, the improvement comprising angular support member configured for attachment to a plate of the plate settler, comprising:
   a first leg defining a headloss control length and a first lateral flow encouraging surface;
   a second leg defining a second lateral flow encouraging surface; and
   wherein a headloss control angle is defined between the first leg and the second leg, and
   wherein the first leg is structured to define a fixed headloss control gap between the first leg and an adjacent portion of the plate settler.

17. The angular support member of claim 16, wherein the headloss control length and the headloss control angle are selected to produce a gap headloss proximate the headloss control gap that is approximately equal to ten times a remainder headloss.

18. The angular support member of claim 17, further comprising an attachment surface,
   wherein the attachment surface faces an opposing direction as compared to the second lateral flow encouraging surface.

19. The angular support member of claim 18, wherein the first leg and the second leg meet at an intersection, wherein a first runoff angle is defined between the first leg and an imaginary horizontal plane passing through the intersection, and
   wherein a second runoff angle is defined between the second leg and the imaginary horizontal plane passing through the intersection.

20. The angular support member of claim 16, wherein the headloss control angle is between approximately 80 and 100 degrees.

21. A method of separating a plurality of solids from a wastewater flow using a plate settler having a plurality of plates, the method comprising:
   providing a plurality of angular support members extending from and structurally supporting respective ones of the plurality of plates, wherein the plurality of angular support members are structured to define a plurality of headloss control gaps and a plurality of generally v-shaped lateral flow channels; and
   directing the wastewater flow through the plurality of plates, through the plurality of headloss control gaps, and into the generally v-shaped lateral flow channels.

22. The method of claim 21, wherein the angular support members comprise a first leg and a second leg, and wherein the first leg defines a first lateral flow encouraging surface and the second leg defines a second lateral flow encouraging surface, and
   wherein the step of directing the wastewater flow into the generally v-shaped lateral flow channels further comprises directing the wastewater flow between the first lateral flow encouraging surface and the second lateral flow encouraging surface of an adjacent plate.

23. The method of claim 22, wherein the step of directing the wastewater through the plurality of headloss control gaps further comprises directing the wastewater between the first leg and the second leg of the adjacent plate.

24. The method of claim 21, wherein at least one of the plates comprises a plate settling surface, and
   wherein the step of directing the wastewater through the plurality of headloss control gaps further comprises directing the wastewater between one of the angular support members and the plate settling surface.

25. The method of claim 21, further comprising directing the wastewater flow generally laterally through the generally v-shaped lateral flow channels to a weir.

26. The method of claim 21, further comprising: providing a weir defining a plurality of v-notches, wherein an aligned notch of the plurality of v-notches is aligned with an aligned gap of the plurality of headloss control gaps; and directing at least a portion of the wastewater flow from the aligned gap, into at least one of the generally v-shaped lateral flow channels, and into the aligned notch.

27. A clarifier system, comprising:
   a weir assembly; and
   a plate settler assembly, comprising:
      a plurality of plates, each plate defining a first end, a second end, and a settling surface defined there between;
      a plurality of angular support members extending from and structurally supporting the first ends of respective ones of the plurality of plates, each angular support member defining a first lateral flow encouraging surface and a second lateral flow encouraging surface;
      a plurality of headloss control gaps defined by the plurality of angular support members; and
      wherein the first lateral flow encouraging surface of each angular support member combines with the second lateral flow encouraging surface of an adjacent angular support member to define a generally v-shaped lateral flow channel.

28. The clarifier system of claim 27, wherein each of the headloss control gaps is positioned proximate to the settling surface of the adjacent plate to provide for cleaning access thereto.

29. The clarifier system of claim 27, wherein each of the angular support members further comprises a first leg and a second leg, and
   wherein the first leg defines the first lateral flow encouraging surface and the second leg defines the second lateral flow encouraging surface.

30. The clarifier system of claim 29, wherein a headloss control angle is defined between the first leg and the second leg.

31. The clarifier system of claim 30, wherein the plate settler is configured to produce a gap headloss and a remainder headloss, wherein the first leg defines a headloss control length, and wherein the headloss control length and the headloss control angle are selected to produce a gap headloss that is approximately equal to ten times the remainder headloss.

32. The clarifier system of claim 27, wherein the weir assembly comprises at least one longitudinally-extending weir, and the clarifier system is further configured such that a fluid flowing through the clarifier system is directed along the generally v-shaped lateral flow channel over the at least one longitudinally-extending weir.

33. The clarifier system of claim 32, wherein the longitudinally-extending weir defines at least one v-notch generally aligned with the generally v-shaped lateral flow channel.

34. The clarifier system of claim 32, wherein the longitudinally-extending weir defines at least one v-notch generally aligned with at least one of the plurality of headloss control gaps.

35. The clarifier system of claim 27, wherein the weir assembly defines a minimum head height such that the plurality of plates remain generally submerged beneath the weir assembly during operation of the clarifier system.

* * * * *